E. H. SPRINGER.
PUSHER FOR GRAIN HEADING MACHINES.
APPLICATION FILED FEB. 8, 1918.
1,338,707.
Patented May 4, 1920.
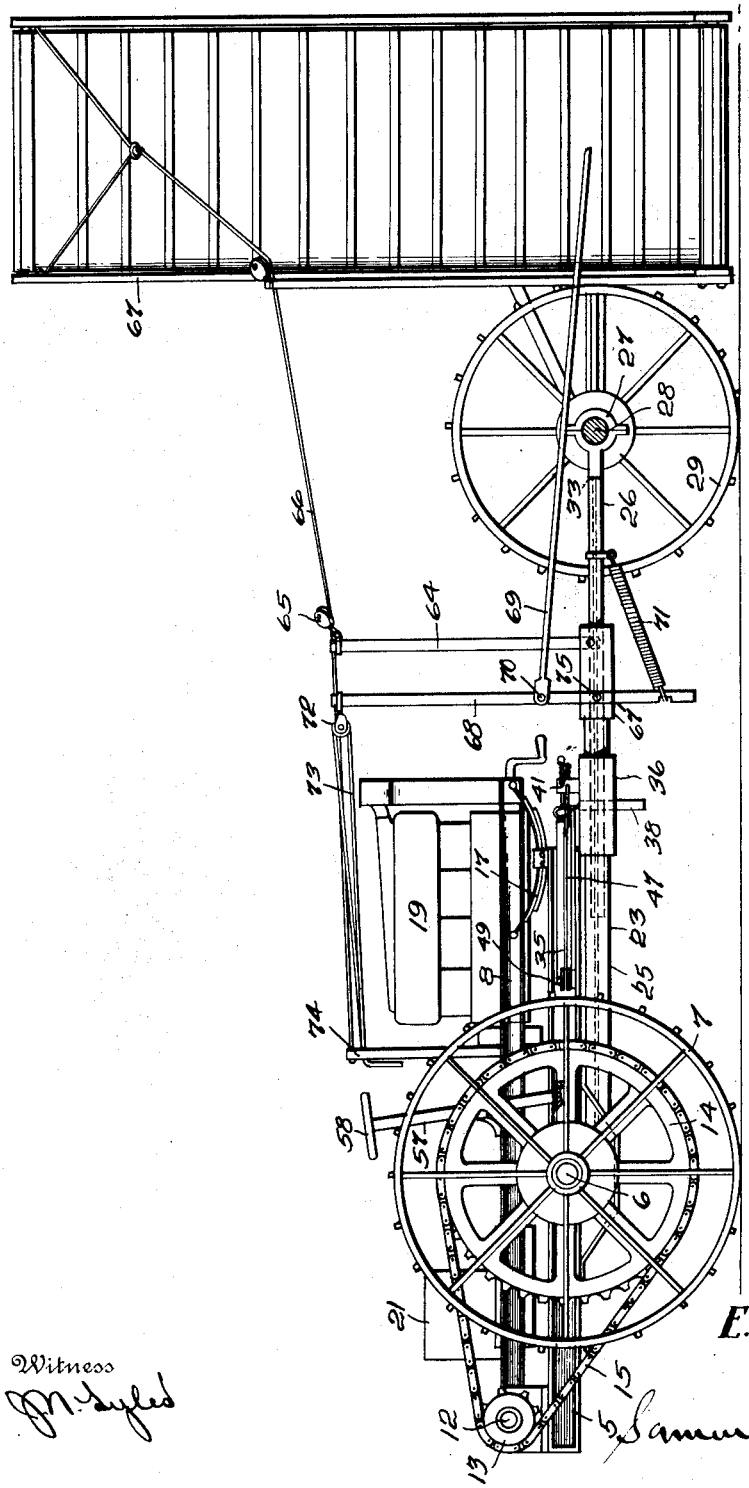

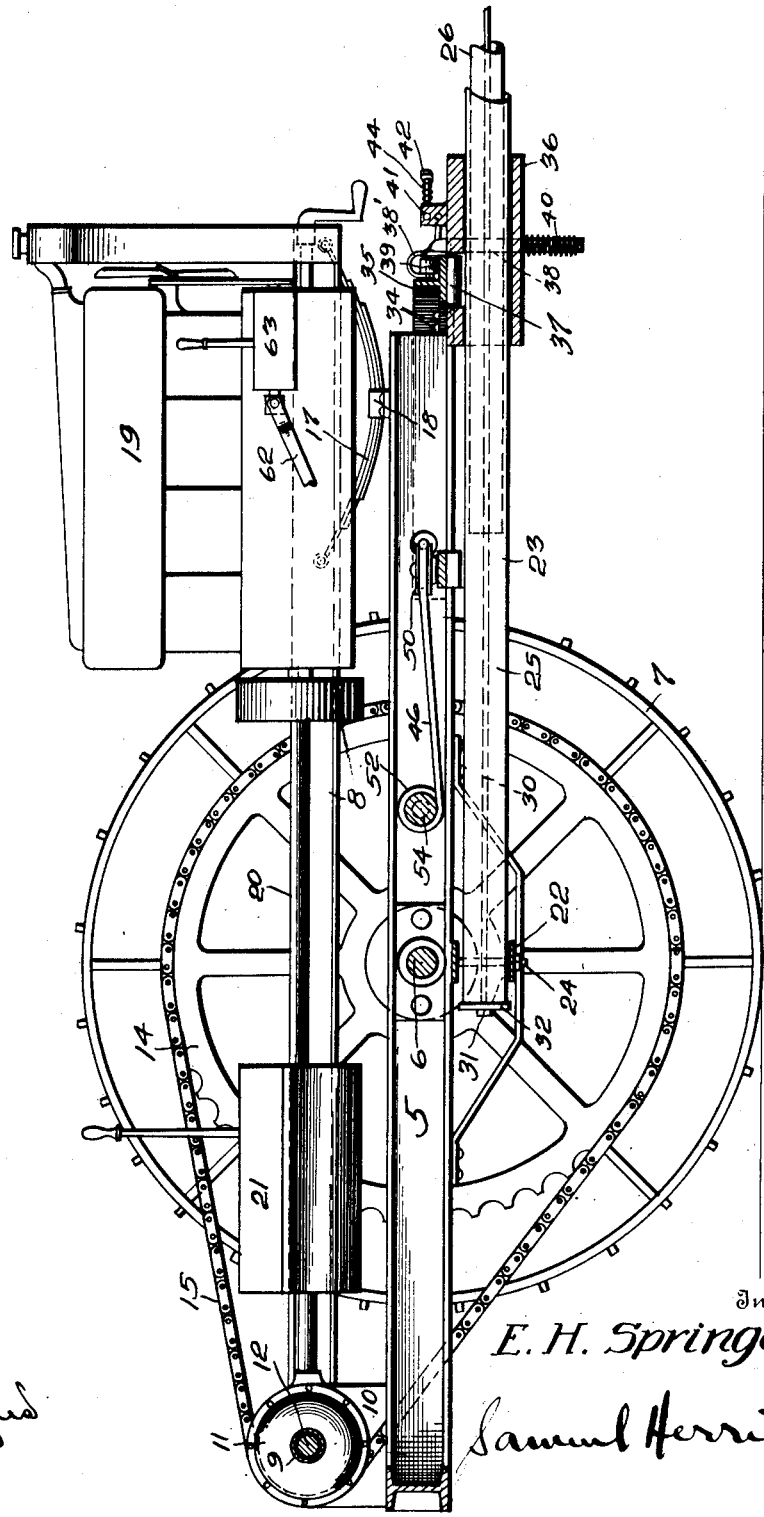

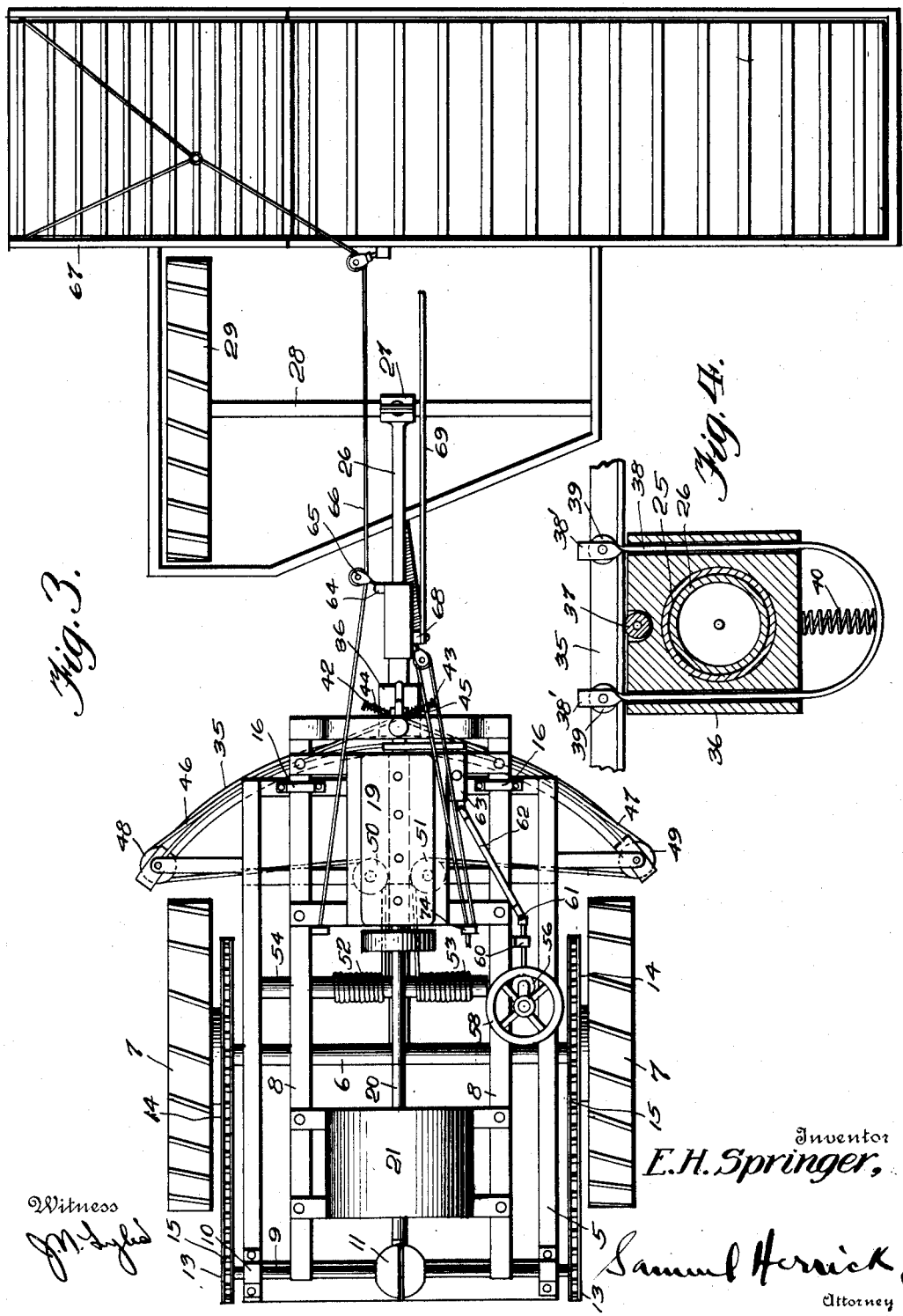

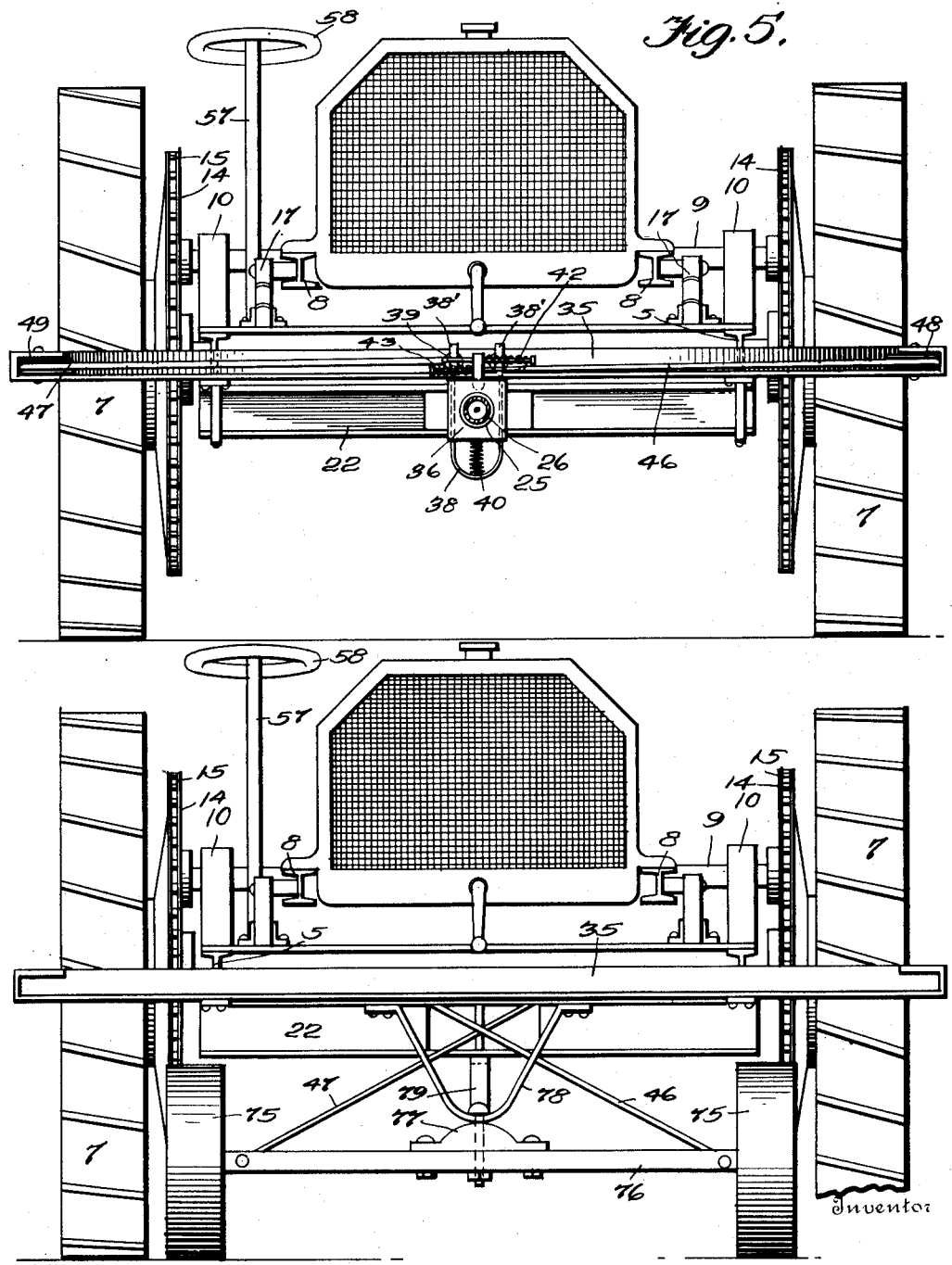

E. H. SPRINGER.
PUSHER FOR GRAIN HEADING MACHINES.
APPLICATION FILED FEB. 8, 1918.
1,338,707.
Patented May 4, 1920.
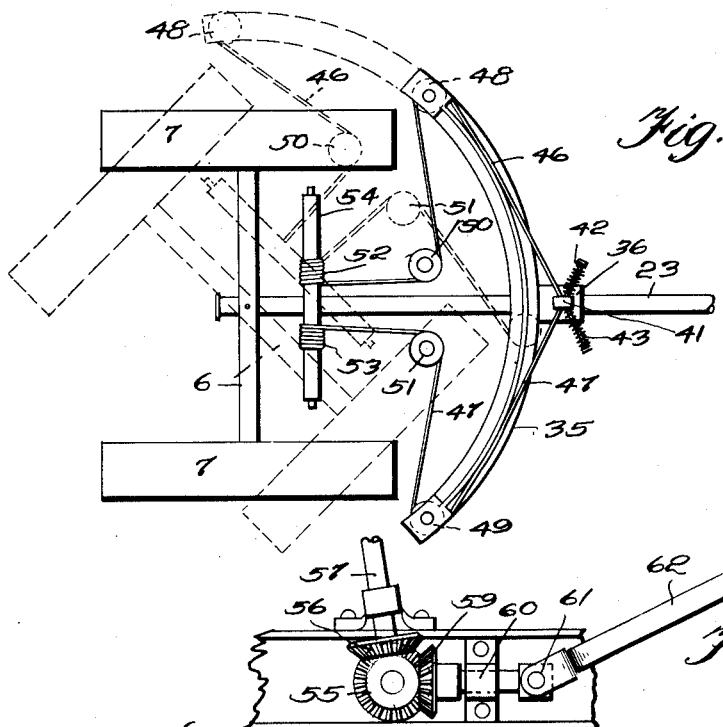
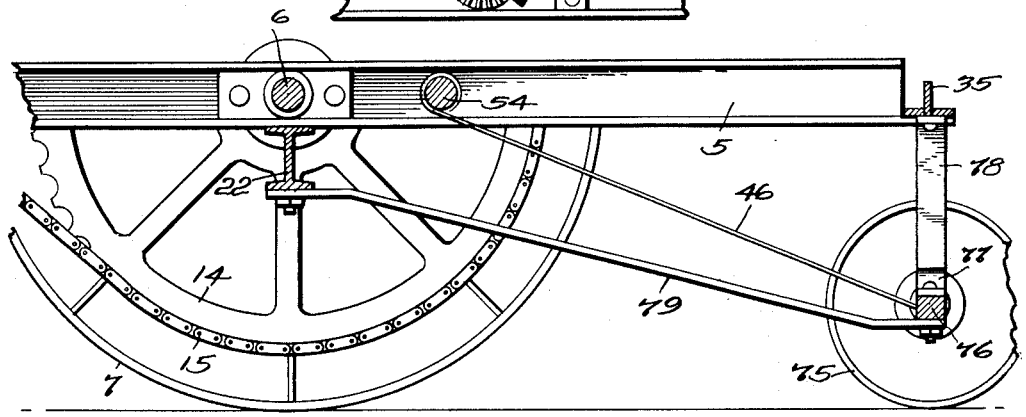
Inventor
E. H. Springer,
By Samuel Herrick,
Attorney
Witness

UNITED STATES PATENT OFFICE.

ELIJAH H. SPRINGER, OF SALT LAKE CITY, UTAH, ASSIGNOR OF ONE-HALF TO E. C. ASHTON, OF SALT LAKE CITY, UTAH.

PUSHER FOR GRAIN-HEADING MACHINES.

1,338,707.   Specification of Letters Patent.   Patented May 4, 1920.

Application filed February 8, 1918. Serial No. 216,028.

*To all whom it may concern:*

Be it known that I, ELIJAH H. SPRINGER, a citizen of the United States, residing at Salt Lake City, in the county of Salt Lake and State of Utah, have invented certain new and useful Improvements in Pushers for Grain-Heading Machines, of which the following is a specification.

Some classes of agricultural implements are constructed in such manner as to be pushed by a team instead of being drawn behind a team. For example, headers are usually pushed ahead of the team. It is the object of this invention to provide a motor driven appliance hereinafter termed a pusher constructed in such manner as to adapt it to be readily and quickly connected to a header or like agricultural machine and to push the same ahead of it, means being provided for effectively controlling the direction of movement of the header and for operating the adjustable parts of the header from the pusher.

The invention further contemplates the provision of means whereby the pusher may be readily and quickly converted into a four wheel tractor, it being understood that when being operated as a pusher only two wheels are employed upon the pusher, the forward part of the pusher being supported from the header.

Further objects and advantages of the invention will be set forth in the detailed description which now follows.

In the accompanying drawings, Figure 1 is a side elevation of a pusher constructed in accordance with the invention and illustrating the same associated with the header wheels.

Fig. 2, is a longitudinal sectional view upon an enlarged scale of the pusher and with the header omitted.

Fig. 3, is a plan view of the pusher.

Fig. 4, is a detail sectional view of a bearing block hereinafter described.

Fig. 5, is a front elevation of the pusher.

Fig. 6 is a front elevation illustrating the pusher structure but with the addition of a front truck to convert the pusher into a tractor.

Fig. 7, is a diagrammatic view illustrating the manner of shifting the wheels of the pusher.

Fig. 8 is an enlarged longitudinal sectional view of a part of the structure illustrated in Fig. 6 and Fig. 9, is a detailed view of a part of the driving connection between the motor and the steering mechanism.

Like numerals designate corresponding parts in all of the figures of the drawings.

Referring to the drawings it will be seen that my improved pusher comprises a main frame 5, which may be made of I beams, though any other form of material may be employed. An axle 6 is journaled in this frame and carries ground wheels 7. An auxiliary frame 8 has its rear end supported from an axle housing 9, which housing is in turn supported by bearing brackets 10, on the frame 5. The axle housing 9 has disposed in its length a differential casing 11 of the type commonly employed in motor vehicles. The axle sections 12 which extend from the differential casing 11 are connected to the ground wheels 7 by sprocket wheels 13 and 14 and sprocket chains 15. The front end of the auxiliary frame 8 passes through guides 16 carried by the frame 5 and the front end of the auxiliary frame is supported upon springs 17 which are connected at 18 to the frame 5. A motor 19 preferably of the internal combustion type drives through a shaft 20 to a transmission case 21, which may contain change speed gearing of any desired type. The particular type of change speed gearing employed forms no part of the present invention since any well known type of change speed gearing may be used in this relation.

Extending transversely of the frame 5 is a beam 22 preferably in the form of an I beam, through which the rear end of a draw beam 23 passes. A king bolt 24 traverses the bar 23 passes. A king bolt 24 traverses the beam 22 and the draw bar and constitutes a pivotal connection which is coincident with the center of the axle 6. The draw bar 23 is made up of telescoping pipes 25 and 26. The forward end of the pipe is secured by a clamp 27 to the axle 28 of the header or implement to be pushed and it will be seen that at this time the wheels 29 of the header support the forward end of the pusher. A rod 30 extends longitudinally through the draw bar and is provided with a head 31 which bears upon a plate 32, said plate in turn bearing against the rear end of the pipe 25. The forward end of the rod 30 is connected by a bolt 33 with the pipe section 26. This construction holds the parts in proper assembled relation during backward movement of the pusher and at the same time permits a certain swiveling movement of the wheels of the header with respect to the wheels of the pusher on rough and uneven ground.

Bolted or otherwise secured at 34 to the frame 5 is an arcuate T bar 35. The bar 25 carries a bearing block 36 and this block in turn carries a longitudinally extending roller 37 upon which the base flange of the T bar 35 rests and travels. A U shaped yoke 38 has its upper end overturned at 38' to provide bearing members for rollers 39 which rest upon the upper face of the base flange of the T bar 35. The legs of the yoke 38 are slidably mounted in the bearing block 36 and a spring 40 normally tends to force this yoke downwardly to thereby hold the rollers 39 into yielding contact with the upper face of the base flange of the T bar. The bearing block 36 is provided with an upstanding stud 41 which is pierced for the passage of rods 42 and 43. Springs 44 and 45 exert a drawing action upon these rods. The rods 42 and 43 form continuations of cables 46 and 47 which pass over pulleys 48 and 49 located at the opposite ends of the T bar. From the pulleys 48 and 49 the cables pass over pulleys 50 and 51 and are then wound in opposite direction at 52 and 53 upon a transverse roller 54. The roller 54 carries a bevel gear wheel 55 at one end which meshes with a bevel gear wheel 56 upon the lower end of a steering rod 57. This steering rod is provided with an operating hand wheel 58. The gear wheel 55 also meshes with a bevel gear 59 (see Fig. 9) which bevel gear wheel is mounted in a bearing bracket 60 and is connected by a universal joint 61 with a drive shaft 62. Motion may be imparted to the drive shaft 62 from the motor 19 through a suitable clutch, (not shown) contained in a casing 63 (see Fig. 2). It will thus be seen that it is possible to steer the pusher either manually or by power from the motor as will be presently set forth.

In practically all agricultural implements it is necessary to effect certain adjustments of the parts during the travel of the machine. For example, in a mower it is necessary to adjust the cutter bar. In a header it is necessary to adjust the sickle bar of the header and it is also necessary from time to time, to adjust the elevators of the header to varying positions of inclination. To enable the driver of the pusher to operate parts upon the machine being pushed I mount upon the pipe 25 a standard 64 which carries at its upper end a pulley 65 over which a cable 66 may pass. This cable is adapted to be attached to the elevator 67 of the header though it is apparent that it may be attached to any part to be adjusted upon the machine being pushed.

For adjusting the sickle bar of the header (not shown) I pivot upon a sleeve 67', carried by the pipe 23, a rocking standard 68 to which a link 69, which extends forward to the header, is pivotally connected at 70. If desired a spring 71 may be employed to aid in moving the part to be adjusted. The standard 68 carries at its upper end a pulley 72 over which a cable 73 passes, said cable being attached at one end to a standard 74 carried by the pusher and extending thence over the pulley 72 and then returning to the standard 74, it being apparent that a pull upon the free end of this cable will result in throwing the upper end of the standard 68 rearwardly upon its pivot 75 and thereby impart a pull to the link 69, to affect the part to be adjusted.

It is apparent that through the connections described the motor 19 may impart movement to the ground wheels of the pusher and that these ground wheels may be shifted to varying positions with respect to the draw bar by movement of the roller 54, it being understood that when this roller is rotated one of the cables 46, 47 will be drawn upon and the other will be slackened and that the reverse will be the case when the roller 54 is rotated in the opposite direction. This will result in imparting a pull upon the rods 42 and 43 to thereby move the structure laterally in one direction or the other with respect to the draw bar, (see Fig. 7) and by the proper manipulation of the steering mechanism as above set forth an effective guiding and steering of the header or machine being pushed may be effectively achieved. In Figs. 6 and 8 I have illustrated a front truck consisting of the front wheels 75, front axle 76 and bolster 77. This front truck is connected by a bracket 78 with the forward portion of the frame and the cables 46 and 47 are connected to the axle 76. A brace bar 79 extends from the front truck to the beam 22. This construction provides means for readily converting the structures of Figs. 1, 2 and 3 into a light and easily handled tractor.

While the elements shown and described are well adapted to serve the purposes for which they are intended it is to be understood that the invention is not limited to the precise construction set forth but that it includes within its purview such changes as fairly come within the spirit of the appended claims.

Having described my invention what I claim is;

1. In a device of the character described the combination with a draw bar, a bearing block carried thereby, a roller carried by the bearing block, an arcuate bar having a horizontal flange and a vertical flange and resting upon the roller of the bearing block and a yielding yoke carried by the bearing block and provided with rollers bearing upon the horizontal flange of the arcuate bar.

2. A device of the character described comprising a pair of ground wheels, a frame supported thereon, a draw bar, cables connected to said draw bar, pulleys carried by the frame over which said cables pass, a roller journaled in the frame upon which said cables are wound in opposite directions and an arcuate T bar by which some of said pulleys are carried, said T bar comprising a horizontal flange and a vertical flange, the vertical flange constituting a guide for said cables, a vertically yielding member and rollers carried thereby and bearing upon the upper surface of the horizontal flange of the T bar.

3. A device of the character described comprising a frame, an axle, ground wheels carried by the axle for supporting the same, an auxiliary frame, a motor carried by the auxiliary frame, bearing brackets carried by the first named frame, a transverse driving element mounted in said bearing bracket, means for driving from the motor to said transverse driving element and for driving from said driving element to the ground wheels, means for mounting the auxiliary frame to swing about the axis of said transverse driving element and springs for supporting the forward ends of the auxiliary frame from the first named frame.

In testimony whereof I affix my signature in the presence of two witnesses.

ELIJAH H. SPRINGER.

Witnesses:
R. E. CLOUGH,
J. K. SMITH.